(12) United States Patent
Bemmel et al.

(10) Patent No.: US 7,512,567 B2
(45) Date of Patent: Mar. 31, 2009

(54) METHOD AND SYSTEM FOR PROVIDING BIOMETRIC AUTHENTICATION AT A POINT-OF-SALE VIA A MOBILE DEVICE

(75) Inventors: Vincent Bemmel, Dublin, CA (US); Shaoib Mian, Pleasanton, CA (US)

(73) Assignee: YT Acquisition Corporation, Delray Beach, FL (US)

( * ) Notice: Subject to any disclaimer, the term of this patent is extended or adjusted under 35 U.S.C. 154(b) by 184 days.

(21) Appl. No.: 11/566,987

(22) Filed: Dec. 5, 2006

(65) Prior Publication Data

US 2008/0046366 A1    Feb. 21, 2008

Related U.S. Application Data

(60) Provisional application No. 60/806,126, filed on Jun. 29, 2006.

(51) Int. Cl.
*H04K 1/00* (2006.01)
*H04L 9/00* (2006.01)
(52) U.S. Cl. .................... 705/67; 713/186; 705/64
(58) Field of Classification Search .............. 705/67, 705/64; 713/186
See application file for complete search history.

(56) References Cited

U.S. PATENT DOCUMENTS

| | | | |
|---|---|---|---|
| 5,764,789 A * | 6/1998 | Pare et al. ............. | 382/115 |
| 6,016,476 A | 1/2000 | Maes et al. | |
| 6,154,727 A | 11/2000 | Karp et al. | |
| 6,559,769 B2 * | 5/2003 | Anthony et al. ......... | 340/574 |
| 7,020,474 B2 | 3/2006 | Scott | |
| 7,035,388 B2 | 4/2006 | Kurosaki | |
| 7,110,792 B2 | 9/2006 | Rosenberg | |
| 7,127,236 B2 | 10/2006 | Khan et al. | |

| | | |
|---|---|---|
| 2001/0016819 A1 | 8/2001 | Kolls |
| 2002/0013736 A1 | 1/2002 | I'Anson et al. |
| 2002/0019811 A1 | 2/2002 | Lapsley et al. |
| 2002/0029172 A1 | 3/2002 | I'Anson et al. |
| 2002/0065774 A1 | 5/2002 | Young et al. |
| 2002/0152179 A1 | 10/2002 | Racov |
| 2003/0001459 A1 | 1/2003 | Scott |

(Continued)

FOREIGN PATENT DOCUMENTS

EP    0598469 A2    5/1994

(Continued)

OTHER PUBLICATIONS

Frost and Sullivan. "Leading European Financial Institution Implements Voice Verification Biometrics to Enrich Customer Experience." (http://www.voicevault.com/pdf/Frost%20Research%20Note%20-%20July%202006.pdf). Jul. 2006.

(Continued)

*Primary Examiner*—Calvin L Hewitt, II
*Assistant Examiner*—Zeshan Qayyum
(74) *Attorney, Agent, or Firm*—Pepper Hamilton LLP

(57) ABSTRACT

A system and method is provided for authorizing a payment for a point of sale transaction by authenticating the user of a mobile device, such as a mobile phone. The present invention authenticates the consumer and verifies that he is authorized to conduct a transaction at the point of sale by means of the consumer's mobile device.

11 Claims, 8 Drawing Sheets

U.S. PATENT DOCUMENTS

| | | |
|---|---|---|
| 2003/0004891 A1 | 1/2003 | Van Rensburg et al. |
| 2003/0046541 A1 | 3/2003 | Gerdes et al. |
| 2003/0055792 A1 | 3/2003 | Kinoshita et al. |
| 2003/0074328 A1 | 4/2003 | Schiff et al. |
| 2004/0026496 A1 | 2/2004 | Zuili |
| 2004/0030894 A1 | 2/2004 | Labrou et al. |
| 2004/0049454 A1 | 3/2004 | Kanno et al. |
| 2004/0083170 A1 | 4/2004 | Bam et al. |
| 2004/0098350 A1 | 5/2004 | Labrou et al. |
| 2004/0107170 A1 | 6/2004 | Labrou et al. |
| 2004/0128197 A1 | 7/2004 | Bam et al. |
| 2004/0147251 A1 | 7/2004 | Nakayama et al. |
| 2004/0243514 A1 | 12/2004 | Wankmueller |
| 2004/0243517 A1 | 12/2004 | Hansen |
| 2004/0250085 A1 | 12/2004 | Tattan et al. |
| 2005/0018883 A1 | 1/2005 | Scott |
| 2005/0027543 A1 | 2/2005 | Labrou et al. |
| 2005/0097046 A1 | 5/2005 | Singfield |
| 2005/0097131 A1 | 5/2005 | Benco et al. |
| 2005/0109838 A1 | 5/2005 | Linlor |
| 2005/0187873 A1 | 8/2005 | Labrou et al. |
| 2005/0194866 A1 | 9/2005 | Scott |
| 2005/0216354 A1 | 9/2005 | Bam et al. |
| 2005/0246253 A1 | 11/2005 | Barthelemy |
| 2005/0247797 A1 | 11/2005 | Ramachandran |
| 2005/0268107 A1* | 12/2005 | Harris et al. ............... 713/182 |
| 2005/0289052 A1 | 12/2005 | Wankmueller |
| 2006/0000900 A1 | 1/2006 | Fernandes et al. |
| 2006/0076400 A1 | 4/2006 | Fletcher |
| 2006/0206709 A1 | 9/2006 | Labrou et al. |
| 2007/0050259 A1 | 3/2007 | Wesley |
| 2007/0052517 A1 | 3/2007 | Bishop et al. |
| 2007/0055517 A1 | 3/2007 | Spector |
| 2007/0064904 A1 | 3/2007 | Wesley |
| 2007/0175978 A1 | 8/2007 | Stambaugh |
| 2007/0179789 A1 | 8/2007 | Bennett |

FOREIGN PATENT DOCUMENTS

| | | |
|---|---|---|
| EP | 1093097 A2 | 4/2001 |
| WO | WO 01/57757 A1 | 8/2001 |
| WO | WO 01/57758 A1 | 8/2001 |
| WO | WO 01/57759 A1 | 8/2001 |
| WO | WO 02/095589 A1 | 11/2002 |
| WO | WO 02/103600 A1 | 12/2002 |
| WO | WO 2005/015485 A1 | 2/2005 |
| WO | WO 2006/000021 A1 | 1/2006 |
| WO | WO 2006/009716 A2 | 1/2006 |
| WO | WO 2006/022513 A1 | 3/2006 |
| WO | WO 2006/023745 A2 | 3/2006 |
| WO | WO 2006/128171 A2 | 11/2006 |

OTHER PUBLICATIONS

Harborlight Technologies, LLC. "Voice Compass." (http://www.harborlight-tech.com/Documents/Voicecompass.pdf). 2006.

iSelfPay. "How the System Works." (http://www.iselfpay.com/how_it_works.html). 2006.

mHave, LLC. "Financial Products." (http://www.mhave.com/financial_products.html#pay_web). 2006.

MNESVC, Inc. "What is TextPayMe?". (https://www.textpayme.com/us/services/services.tpm). 2006.

MobileLime. "MobileLime Support FAQ's" (https://www.mobilelime.com/mobilelime/home.do?action=faq). 2006.

Motorola, Inc. "Motorola M-Wallet Solution." (http://www.motorola.com/networkoperators/pdfs/M-Wallet-Brochure.pdf). 2006.

MyTango. "MyTango Services." (https://www.mytango.com/services). 2006.

NCS mobile payment GmbH. "Crandy: Pay With Your Cell—FAQ." (http://www.crandy.com/homepage/en/faq/faq.jsp). 2006.

NTT DoCoMo, Inc. "What's 'Osaifu-Keitai'?". (http://www.nttdocomo.co.jp/english/service/imode/osaifu/index.html). 2006.

Obopay, Inc. "FAQ." (https://www.obopay.com/consumer/GetHelp.do?target=HelpFAQPage). 2006. PayPal. "Buy It When You See It—Use Your Phone." (https://www.paypal.com/cgi-bin/webscr?cmd=xpt/cps/mobile/MobileT2B-outside). 2006.

PayWi Corporation. "Frequently Asked Questions." (http://www.paywi.com/faq/index.html). 2006.

VoiceVerified, Inc. "VoiceVerified for M-Commerce." (http://www.voiceverified.com/applications/mcommerce.php). 2005.

VoiceVerified, Inc. "VoiceVerified for Payment Services." (http://www.voiceverified.com/applications/payment-services.php). 2005.

Biometric Security, Ltd. "VoiceVault Caller Authentication." (http://www.voicevault.com/ca.aspx). 2007.

Biometric Security, Ltd. "VoiceVault Web Authentication." (http://www.voicevault.com/wa.aspx) 2007.

Mobo Systems, Inc. "How GoMoboWorks." (http://gomobo.com/Help/?id=12). 2005.

* cited by examiner

METHOD AND SYSTEM FOR PROVIDING BIOMETRIC AUTHENTICATION AT A POINT-OF-SALE VIA A MOBILE DEVICE

CLAIM OF PRIORITY

This application claims priority benefit under 35 U.S.C. § 119(e) from provisional application No. 60/806,126, filed Jun. 29, 2006. The 60/806,126 provisional application is incorporated by reference herein, in its entirety, for all purposes.

TECHNICAL FIELD

The disclosed embodiments pertain to a mobile architecture for payment transactions and more specifically, a method and system for providing biometric authentication at a point-of-sale ("POS").

BACKGROUND

Current methods for utilizing mobile devices, such as cell phones, to make purchases at POSs typically focus on using stored value accounts for payment and personal identification numbers ("PINs") and/or callback confirmation messages in order to validate purchases. For example, MobileLime offers a cell phone payment solution based on "pre-authorization." A consumer registers with MobileLime by providing a PIN to the MobileLime system via its website. By presenting cash at a participating merchant location or conducting a credit or debit card transaction via the MobileLime website, a consumer can "prepay" a specified amount into a stored value account. Alternatively, a consumer can directly link a credit or debit card to his MobileLime account. When the consumer subsequently visits a participating merchant, he dials the MobileLime number and, using dual-tone multi-frequency ("DTMF") or interactive voice response ("IVR"), enters his PIN and a merchant identification number (visible at the merchant location or available at the MobileLime website) in order to pre-approve his purchase. When the consumer is ready to complete his purchase, he tells the clerk the last four digits of his cell phone number to consummate the transaction. MobileLime's back-end system interfaces with the POS to settle the transaction by deducting the appropriate purchase amount from the consumer's account.

The MyTango system functions somewhat similarly. MyTango enables a consumer to design "preorders" via the MyTango website for specific merchants (e.g., restaurant chains, etc.) such that the consumer is able to send a Short Message Service ("SMS") code for the designed preorder to the MyTango system. The system verifies that the MyTango consumer's stored value account contains sufficient funds and transfers the payment to the merchant. The system then forwards the order to the merchant who prepares the order.

Other cell phone payment solutions intended to be used at merchant locations involve technologies using over the air ("OTA") or contactless interfaces, such as Radio Frequency Identification ("RFID"), Near Field Communication ("NFC"), Bluetooth, or infrared technologies, to transfer data or otherwise communicate with a merchant's payment system. Such payment solutions typically require consumers to use specialized mobile devices (e.g., with contactless capabilities) and merchants to employ additional hardware devices (e.g., RFID or NFC readers). For example, DoCoMo requires a participant to use a smartcard-equipped mobile phone (known as a "wallet phone" or "Osaifu-Keitai"). The smartcard, also called an integrated circuit ("IC") card, enables the mobile phone for contactless payments, as well as other functions. To conduct a purchase, a consumer must first add value to his DoCoMo account, which is stored within the phone via the smartcard. The consumer can do so using the DoCoMo Internet billing application via the phone by entering his password and the amount he wishes to add via the phone's interface. Additionally, he can present his mobile phone at a physical location, such as at a POS or an automated kiosk equipped with a contactless reader, and add value by providing cash or credit. Alternatively, a DoCoMo user can associate his smartcard-equipped mobile phone with a DoCoMo credit account, thereby allowing the phone itself to function as a credit card. In all of the foregoing configurations, the consumer can use his mobile phone for payments by waving it in front of a contactless reader at the POS and the consumer's DoCoMo account is charged accordingly.

Other mobile payment solutions are less focused on POS transactions. For example, PayPal's mobile payment solution enables a cell phone owner to send an SMS message to purchase an item appearing in an advertisement. First, a consumer registers at least one financial account (checking, credit, debit, stored-value, etc.) with PayPal to be used for online or mobile payments. Typically, the consumer sets one financial account as a default for all PayPal payments. When the cell phone owner sees a PayPal icon with an SMS number and product code appearing in an advertisement, he sends an SMS message containing the product code to the number. PayPal immediately calls the cell phone owner and requests that he enter a PIN to confirm the purchase. If the consumer provides the proper PIN, the transaction is billed to his PayPal account.

The aforementioned mobile payment solutions depend upon the proper use of the mobile device involved in the transaction, but do not provide strong authentication of the consumer utilizing it. Solutions requiring pre-authorization or preordering could allow an interceptor to impersonate the cell phone owner at the POS without the device. For example, in the MobileLime system, if an imposter knows or suspects that the cell phone owner has pre-authorized a MobileLime transaction and knows the owner's cell phone number, the imposter could offer the last four digits of the cell phone number at the POS and attempt a purchase based on the pre-authorization. Similarly, MyTango does not appear to offer any authentication at the merchant location and an imposter could pick up a preordered meal if he is aware of the cell phone owner's preorder.

Some of the foregoing solutions utilize PINs/passwords to authenticate the cell phone owner. Although such security mechanisms offer some level of authentication, they are weaker or at best equivalent to other payment systems available for POS transactions; therefore, the industry may be hesitant to move towards higher value mobile payment transactions. For example, if a criminal steals the mobile device of a MobileLime user and is able to decipher the PIN, he can use the mobile device as if he were the legitimate owner. Mobile payment solutions that store a consumer's financial account information on his mobile device are at even greater risk. For example, a DoCoMo mobile phone stores financial account information on an integrated smartcard, and once a criminal defeats the device's security features (if any), he has instant access to the owner's financial account.

Some mobile devices are equipped with biometric readers, such as fingerprint sensors, and restrict access via biometric security measures. For example, mHave offers mobile payment services via a mobile phone equipped with a fingerprint sensor. However, as of the date of the disclosure, the typical consumer does not own such a device because they are not commonly available or affordable.

Additionally, mobile payment solutions that require specially equipped mobile devices to communicate with the POS terminal can hinder adoption due to the need for consumers to purchase such specially equipped devices and merchants to purchase hardware infrastructure to support such devices.

Furthermore, many mobile payment solutions do not account for the limitations of mobile devices. Cell phone interfaces offer limited keypad functionality, which can make sending text messages inconvenient, especially during a transaction at a POS. Likewise, DTMF methods typically require the consumer to switch back and forth between listening to the phone and pressing the keypad. IVR solutions in which a PIN is spoken into the cell phone also risk compromise of secret information by eavesdroppers. Such issues can lessen the appeal of mobile payment solutions and thereby limit their adoption.

In contrast to current mobile payment solutions, biometric authentication systems offer merchants a convenient and secure means for POS transactions. For example, the Pay By Touch biometric payment solution allows a consumer to register multiple payment accounts, as well as loyalty account information and other personal and identity-related information, in a central location. A Pay By Touch user can access this information by providing a fingerprint scan at a POS terminal. However, to implement such a system, a merchant's POS terminals must be equipped with biometric sensors and the associated operating systems. Regardless of the benefits (e.g., security, convenience, etc.), a merchant may be hesitant to implement such a biometric payment solution due to the cost, time and other resources required for installation.

What is needed is a more strongly authenticated mobile solution that enables secure and convenient payments in a merchant setting without necessitating additional hardware integration at the POS or specially equipped mobile devices. The system of the present invention stores the consumer's financial data at a central location, and the consumer can access it via a merchant's standard payment terminal to select the desired account. The consumer does not need a special mobile device to participate, nor does the merchant need to install biometric sensors and associated equipment. Thus, the present invention allows for the implementation of a biometric mobile payment system without the necessity of cost-prohibitive equipment.

SUMMARY

The present invention utilizes biometric authentication through a mobile device to provide a convenient and secure payment means at a POS. When a consumer desires to make a purchase, he authenticates himself by establishing a call with an identity provider service and providing a voice sample to authenticate himself biometrically as well as based on the textual content of the voice sample (e.g., a password). Thereafter, the authenticated consumer can access his centrally registered information from the identity provider service to conduct a transaction at a POS terminal.

In particular, the disclosures herein teach, in part, a method for enrolling the consumer in such a mobile payment system, wherein the method comprises receiving registration information (including, for example, a mobile phone number) from the consumer through an online connection such as a website, generating an electronic wallet for the consumer containing the registration information, establishing a voice connection with the consumer's mobile device (i.e., associated with the mobile phone number), capturing a voice sample from the consumer; and storing the voice sample in association with the mobile phone number for biometric authentication purposes.

Once a consumer is enrolled in the mobile payment system, he is able to initiate payment transactions utilizing his mobile phone. During such a transaction, the mobile payment system as taught herein would receive an initiation request from the consumer's mobile phone (e.g., either a voice connection or a text message, etc.) for establishing a voice connection. This results in the receipt of a device identifier (such as, for example and without limitation, the mobile phone number of the mobile device), allowing the mobile payment system to determine if the device identifier corresponds to a registered device identifier (established during the foregoing enrollment process). If so, the mobile payment system can establish a voice connection with the mobile device, receive through the voice connection a voice sample of the consumer associated with the mobile device, compare the voice sample with a registered voice sample associated with the mobile device (again, established during the foregoing enrollment process), convert the voice sample into a text sequence, compare at least a portion of the text sequence with a registered text sequence (also established during the foregoing enrollment process) associated with the mobile device, generate an authorization identifier to be presented by the consumer at a point of transaction; and transmit the authorization identifier to the mobile device.

Upon receiving the authentication identifier through the mobile phone (confirming authentication of the consumer), the consumer is able to conduct a transaction at a merchant point-of-sale terminal through the teachings disclosed herein. In particular, when the consumer interacts with the merchant's point-of-sale terminal, the mobile payment system receives a request from the merchant point-of-sale terminal for consumer information (e.g., payment information such a credit card, debit card or checking account numbers, etc.) with the request including the authorization identifier, it matches the authorization identifier with a stored authorization identifier (for example and without limitation, "staged" transaction as further detailed herein) in order to obtain a consumer identifier associated with the stored authorization identifier, and it transmits stored consumer information (e.g., payment information such as a credit card, debit card, checking account, etc.) associated with the consumer identifier to the merchant point-of-sale terminal, which enables the merchant point-of-sale to authorize the transaction by communicating with a payment processor.

DETAILED DESCRIPTION

Various embodiments of the invention are discussed in detail below. While specific implementations are discussed, it should be understood that this is done for illustration purposes only. A person with ordinary skill in the relevant art will recognize that other components and configurations can be used without parting from the spirit and scope of the invention.

Figure 1:
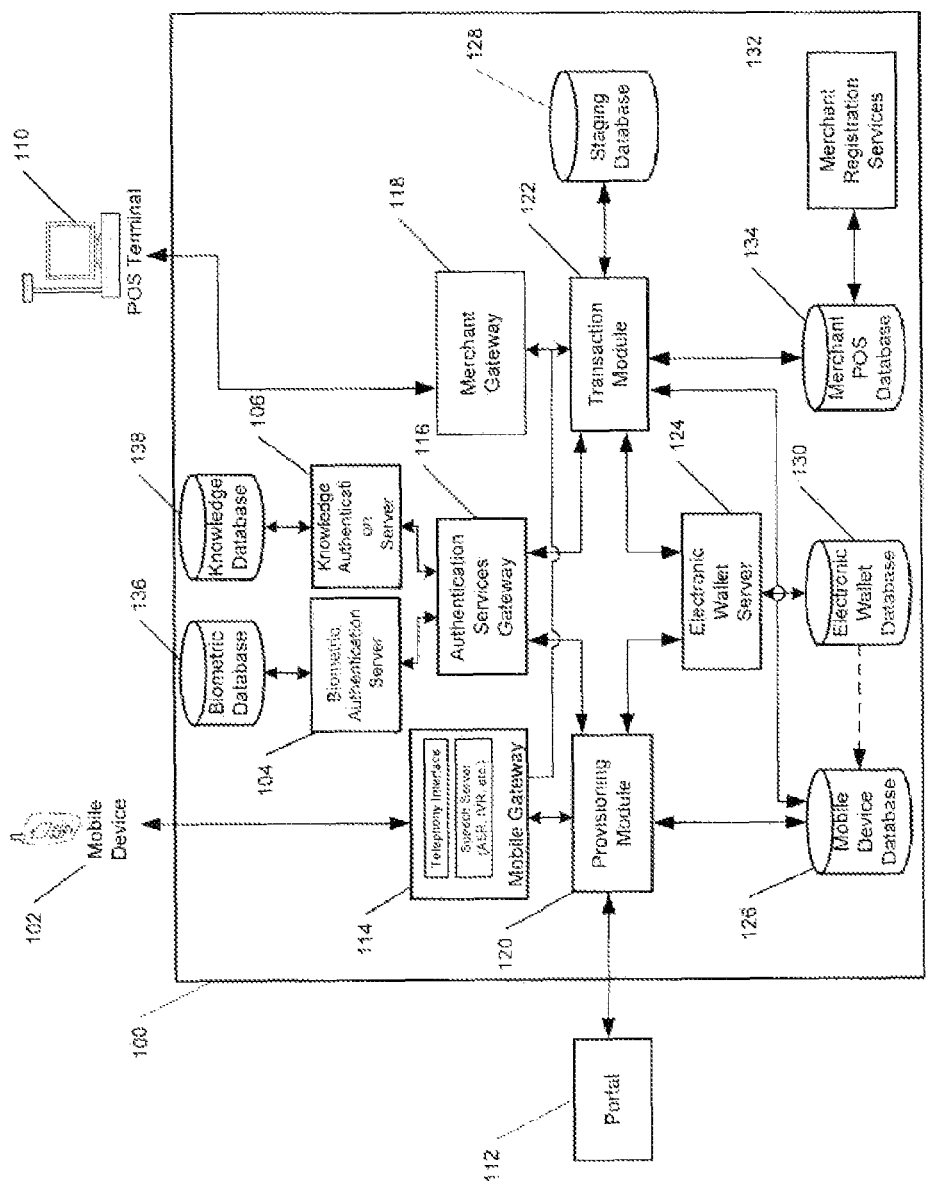
FIG. 1 depicts an exemplary component architecture of an identity provider service.
Figure 2:
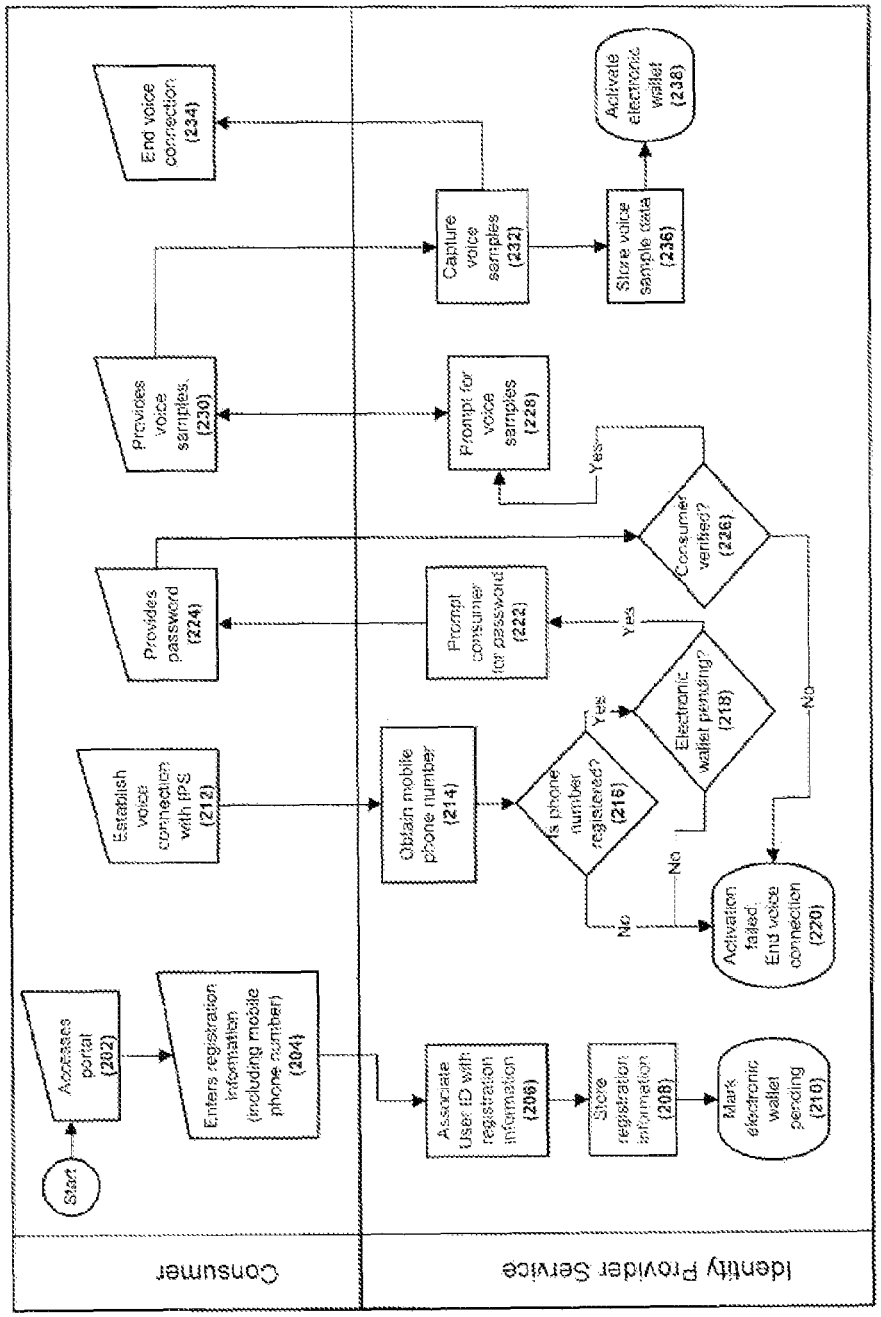
FIG. 2 depicts a flowchart of a process for a consumer possessing a mobile device to enroll with an identity provider service.

FIG. 1 depicts an exemplary component architecture for an identity provider service ("IPS") capable of authorizing a consumer biometrically (e.g., via his mobile device) for a payment transaction. Those with ordinary skill in the art will recognize that the logical components set forth in FIG. 1 are merely exemplary and that other configurations that provide substantially similar functionality to that of the logical components in FIG. 1 can be used consistent with the scope of the invention. As depicted in FIG. 1, the IPS 100 is capable of both enrolling a consumer to use such a service (i.e., via the provisioning module 120) and biometrically authenticating a consumer (e.g., via his mobile device) desiring to conduct a payment transaction (i.e., via the transaction module 122).

An "electronic wallet" can be thought of, conceptually, as a record housing various consumer information, as well as serving as an access point to consumer information stored throughout the IPS 100. A consumer identifier, such as a unique identification number (hereinafter, the "User ID"), associated with an electronic wallet can connect consumer information allocated throughout the different components of the IPS 100, enabling the IPS 100 to keep track of a consumer's data and transactions, as described below.

Enrollment Via the Provisioning Module

When a consumer wishes to enroll with the IPS 100, or supplement previously registered information, he can access the portal 112 (e.g., website, kiosk, customer service desk, etc.) to interface with the IPS 100 (step 202). The consumer provides registration information as prompted (step 204). Registration information submitted by a consumer may include demographic information (e.g. name, age, gender, date of birth, address, etc.), financial account information (e.g., credit, debit, or checking account numbers, etc.), verification information (e.g., the mother's maiden name, a password, etc.), a mobile phone number, healthcare information (e.g. policy number, insurance carrier, etc.) and other similar personal and identity-related information. Registration information is transmitted from the portal 112 to the provisioning module 120 of the IPS 100. In one embodiment, the provisioning module 120 could determine it the received information, such as the mobile phone number, has been previously registered.

The provisioning module 120 may generate and associate a User ID with the registration information (step 206) and store it in the proper database as depicted in FIG. 1 (step 208). For example, demographic data, financial account information, loyalty account information, and healthcare information can be routed to the electronic wallet server 124. The electronic wallet server 124 then associates the User ID with a new electronic wallet in the electronic wallet database 130 and populates the electronic wallet with this information. In some embodiments, if the consumer registers more than one financial account, he can designate one as a default account to be used automatically at subsequent transactions. A consumer can enroll one or more loyalty accounts (e.g., relating to particular merchants), thereby enabling the IPS 100 to perform loyalty program functionality on his behalf. For example, a consumer can provide the identification number found on a loyalty card he received from a particular merchant. An example of biometric systems and methods capable of handling loyalty program functionality is found in U.S. patent application Ser. No. 11/421,458, the disclosure of which is incorporated herein by reference in its entirety.

Additionally, the provisioning module 120 can route verification information to the authentication services gateway 116, which sends it onto the knowledge authentication server 106 for storage, in association with the User ID, in the knowledge database 138. Verification information can include, for example, a password that is used as a factor of authentication prior to providing access to information in the consumer's electronic wallet (as described below). As the consumer enters registration information into the portal 112, he may be prompted to provide a password, such as one or more words and/or numbers (e.g., a security code), an answer to a challenge question (e.g., "What is your mother's maiden name?"), or other information related to the consumer not commonly known to others. In one embodiment, rather than prompting the consumer to select a particular password, the provisioning module 120 can select an element of the received registration information to be used as the password.

A mobile phone number and other information about the mobile device 102 (e.g., carrier, manufacturer, or other device identification numbers) received as part of the enrollment process can be routed by the provisioning module 120 to the mobile device database 126 for storage in association with the User ID. In one embodiment, the mobile phone number itself serves as the User ID and therefore other mobile device information could be associated with it or it could be stored by itself in the mobile device database 126. Although the mobile device 102 is typically referred to herein as a mobile phone, it could be any portable device capable of performing telecommunication functions, such as a PDA, a handheld computer, or the like. In one embodiment, more than one consumer can register for the same mobile device 102, such as a husband and wife sharing a mobile phone. Multiple consumers can be associated (e.g., via their User IDs) with the mobile device information stored in the mobile device database 126 for a particular mobile device 102. Likewise, one consumer could register more than one mobile phone number (i.e., more than one mobile device 102) with the IPS 100. For example, a consumer could have a business mobile phone and a personal mobile phone and wish to use both for mobile payment transactions. A consumer can be associated (e.g., via a User ID) with more than one mobile device 102 registered in mobile device database 126.

If a consumer accesses the portal 112 to update previously registered information (as opposed to enrolling), the provisioning module 120 associates the updated registration information with the consumer's existing User ID. The User ID may be used for internal tracking purposes only and may not necessarily be known by the consumer. Therefore, the provisioning module 120 can locate the appropriate User ID once the consumer has been verified, such as via biometric authentication and/or knowledge data verification and use the User ID as the primary identification number to supplement a consumer's information throughout the various databases in FIG. 1. In an alternate embodiment, the consumer is aware of his User ID and provides it via the portal 112.

Once the provisioning module 120 has received the registration information and allocated it, the consumer's electronic wallet may be marked as pending (step 210). That is, the IPS 100 stores the received consumer information, but does not enable it for use until the consumer completes enrollment by activating it through an authentication process as described below. Alternatively, if the consumer is updating information previously registered, the electronic wallet could remain activated for use or it could be marked pending until the consumer undergoes activation steps in order to verify and/or authorize the changes made.

If a consumer has begun enrollment but is unable to provide all the necessary registration information in one session, the IPS 100 could store the data it has received. The consumer can provide additional information later by accessing the portal 112 and verifying his identity by providing previously supplied information, such as a password. Once he is identified, the provisioning module 120 can access his data and continue the enrollment process.

Activating the electronic wallet typically includes a call session between the IPS 100 and the consumer through the consumer's mobile device 102 in order to (1) ensure that the consumer is registering with a mobile device 102 that is truly in his possession, and (2) obtain voice samples for storage in order to provide biometric authentication and/or knowledge-based authentication during a payment transaction.

A call is established between the consumer's mobile device 102 and the IPS 100 (step 212). For example, a website embodiment of the portal 112 could present an HTML button and display a message such as, "Click this button and we will call you to activate your new electronic wallet!" Additionally or alternatively, the consumer could specify a time for the activation call. In another scenario, the portal 112 could display an activation phone number and request the consumer call it. In an alternate embodiment, the consumer could send a text message to the IPS 100, which could then call the consumer on his mobile device 102.

Such communication between the IPS 100 and the mobile device 102 would be driven by the mobile gateway 114 of the IPS 100 and managed (e.g., initiated, in some embodiments) by the provisioning module 120 after receiving sufficient registration information (e.g., a mobile phone number) from the consumer. The mobile gateway 114 can include a telephony interface and a speech server (for automatic speech recognition ("ASR"), IVR, etc.). The mobile gateway 114 obtains the mobile phone number (e.g., acquired via caller ID) from the incoming transmission and forwards the mobile phone number to the provisioning module 120 (step 214). The provisioning module 120 verifies whether the mobile phone number is registered in the mobile device database 126 (step 216). If so, the provisioning module 120 retrieves the User ID associated with the mobile phone number and sends this User ID to the electronic wallet server 124. The electronic wallet server 124 in turn locates the electronic wallet associated with the User ID stored in the electronic wallet database 130, and determines if it is marked pending (step 218).

If the mobile phone number is not registered or if the associated electronic wallet is not marked pending (e.g., it is already active), the consumer is so informed and the call is terminated (step 220). The provisioning module 120 could connect the consumer with a customer service representative or could prompt the mobile gateway 114 to play a recording that explains the issue and provides the consumer with instructions to correct the problem. For example, the consumer could be requested to call a particular helpline or to visit a customer service desk.

If the unactivated electronic wallet is located, the provisioning module 120 can request the mobile gateway 114 to prompt the consumer for a password in order to verify that he is the same consumer that initiated the enrollment process via the portal 112 (step 222). The consumer could provide the password via a variety of mediums, such as ASR or DTMF (step 224). Once the mobile gateway 114 has obtained the password from the consumer, converting it into a text sequence if need be, it sends it to the provisioning module 120. The provisioning module 120 sends the password data and the User ID to the authentication server gateway 116, which in turn conveys them to the knowledge authentication server 106. The knowledge authentication server 106 retrieves verification information associated with the riser ID from the knowledge database 138 and compares it with the received password data to determine if the consumer's identity is verified (step 226). The result of the comparison is indicated to the provisioning module 120. If the password provided does not match the registered verification information, the call could be terminated (perhaps after allowing the consumer another chance to enter the correct password) (step 220). In one embodiment, the provisioning module 120 could note the mobile phone number and/or the associated electronic wallet on a failed enrollment log. The failed enrollment log could be reviewed to determine why consumers are failing verification or to detect fraudulent behavior.

If the received password data matches the registered verification information, the enrollment process continues. The provisioning module 120 instructs the mobile gateway 114 to request one or more voice samples from the consumer (step 228). The mobile gateway 114 captures the voice samples (step 232) and routes them to the provisioning module 120, which in turn submits the captured voice samples to the authentication services gateway 116, which routes them to the biometric authentication server 104. The biometric authentication server 104 can extract the biometric data contained within the voice samples, typically generating one or more biometric templates. The extracted biometric data is stored in the biometric database 136 in association with the User ID (step 236). Depending upon the embodiment, the voice samples could be based upon one or more particular phrases the consumer is prompted to speak. The voice samples could be used solely for biometric authentication or the provisioning module 120 could, in certain embodiments, also be used to confirm the verification information obtained during step 204 to ensure greater authentication of the enrolling consumer. For example, the voice samples requested by the mobile gateway 114 may be a sample of consumer articulating his mother's maiden name, date of birth, or a security code. For example and without limitation, rather than separately prompting the consumer for a password through steps 222 through 226, the same voice sample may be used both for knowledge-based and biometric authentication purposes. Upon receiving the voice sample from the mobile device 102, in addition to transmitting the voice sample to the provisioning module 120, the mobile gateway 114 may also translate the spoken speech of the sample into a text sequence containing the actual verification information (e.g., the actual name, date of birth or security code) utilizing ASK technology. The text sequence could be transmitted to the provisioning module 120, on to the authentication services gateway 116, and then to the knowledge authentication server 106, which could confirm such obtained verification information against the registered verification information acquired during step 204 that is stored in the knowledge database 138 in association with the User ID. Additionally, or alternatively, text sequences generated during electronic wallet activation could be stored in association with the User ID in the knowledge database 138 and utilized during consumer authentication at subsequent transactions. Once the consumer has provided the requested voice samples, the call is ended (step 234). The provisioning module 120 activates the electronic wallet associated with the User ID and it is marked ready for use (step 238).

Although one enrollment process has been detailed, this is not to be construed as limiting and other methods could be enabled by the system of the present invention. In one embodiment, the IPS 100 could have access to third party resources, such as financial or demographic databases, and utilize such resources during the enrollment process. For example, the provisioning module 120 could use utilize these resources to acquire consumer registration information, thereby alleviating the amount of information a consumer needs to provide. Furthermore, before activating a consumer's electronic wallet, the provisioning module 120 could use such resources to validate received information (e.g., to determine if a financial account is valid), and/or to perform risk checks (e.g., to evaluate a consumer's credit history). In other alternate embodiments, enrollment can be initiated via a consumer's mobile device 102. Doing so could alleviate the need for a consumer to utilize different channels to complete enrollment (e.g., initiating enrollment via a website and concluding via a mobile device 102). Furthermore, such alternative methods could alleviate or lessen the need for possibly expensive kiosks and customer service equipment and training. For example, if the consumer's mobile device 102 has an Internet interface the mobile device 102 itself could serve as the portal 112. In another example, the consumer can undergo complete enrollment via a call session initiated from his mobile device 102. The mobile gateway 114 can acquire the phone number of the mobile device 102 (e.g., via caller ID) and transmit it to the transaction module 122. If the acquired phone number is not registered or listed as active in the mobile device database 126, the provisioning module 120 can take over processing and the consumer can be prompted to enroll. If the consumer calls a designated enrollment number, the mobile gateway 114 could transmit the acquired phone number directly to the provisioning module 120. Alternatively, the mobile gateway 114 could determine if the acquired number is registered first and then transmit it appropriately (i.e., to the provisioning module 120 for an unregistered number or to the transaction module 122 for a registered number). Registration information and voice samples can be received by the mobile gateway 114, such as via DTMF, ASR, and IVR, and handled by the provisioning module 120 as previously detailed, Once the IPS 100 has received sufficient information and, optionally, verified it with third party resources, the consumer's electronic wallet can be marked active. The consumer could receive a confirmation message during the voice connection, or the IPS 100 could contact him later (e.g., text message, voice call, etc.). If the consumer wishes to enable Internet access for his electronic wallet, he could register a password for this purpose during enrollment. Then, to access his electronic wallet via the Internet, the consumer can provide this password and another consumer identifier, such as his mobile phone number, via an IPS 100 website.

The quality of the voice data acquired during enrollment could have a bearing on the processes of the IPS 100 during subsequent transactions. Therefore, the IPS 100 could enable supplemental methods of acquiring the consumer's voice samples. For example, if during enrollment the mobile gateway 114 determines that the current phone connection is too poor for an accurate voice sample capture, the consumer could be requested to call back from a location with a stronger signal. Alternatively, the consumer could be provided with an activation phone number and a password to use from a different phone, such as a landline. This would allow the consumer to call in from a landline phone, which typically does not have the same variable sound quality issues as a mobile phone. Because the phone used to call the IPS 100 is not the mobile device 102, the consumer could identify himself by entering a registered password.

In addition to enrolling a new consumer with the IPS 100 or updating an existing consumer's electronic wallet, the enrollment process described above could also allow a consumer registered with an IPS 100 offering other identity authentication services (e.g., in addition to mobile payments) to enable mobile payment functionality. An IPS 100 could, for example, offer multiple methods to authenticate consumers biometrically, such as via their fingerprints at biometric sensors located at POS terminals 110 or by their voices via mobile devices 102. An individual enrolled for fingerprint authentication could enable mobile device authentication functionality by undergoing the foregoing process described.

Payment Transactions Via the Transaction Module

To conduct a mobile payment transaction, a consumer may utilize his mobile device 102 to initiate a process to transmit information contained within his electronic wallet from the IPS 100 to a merchant's POS terminal 110. Conducting a mobile payment transaction typically includes a cellular call session between the IPS 100 and the consumer in order to (1) authenticate the identity of the consumer and (2) alert the IPS 100 that the consumer plans to utilize its services to conduct an upcoming payment transaction.

Figure 3:
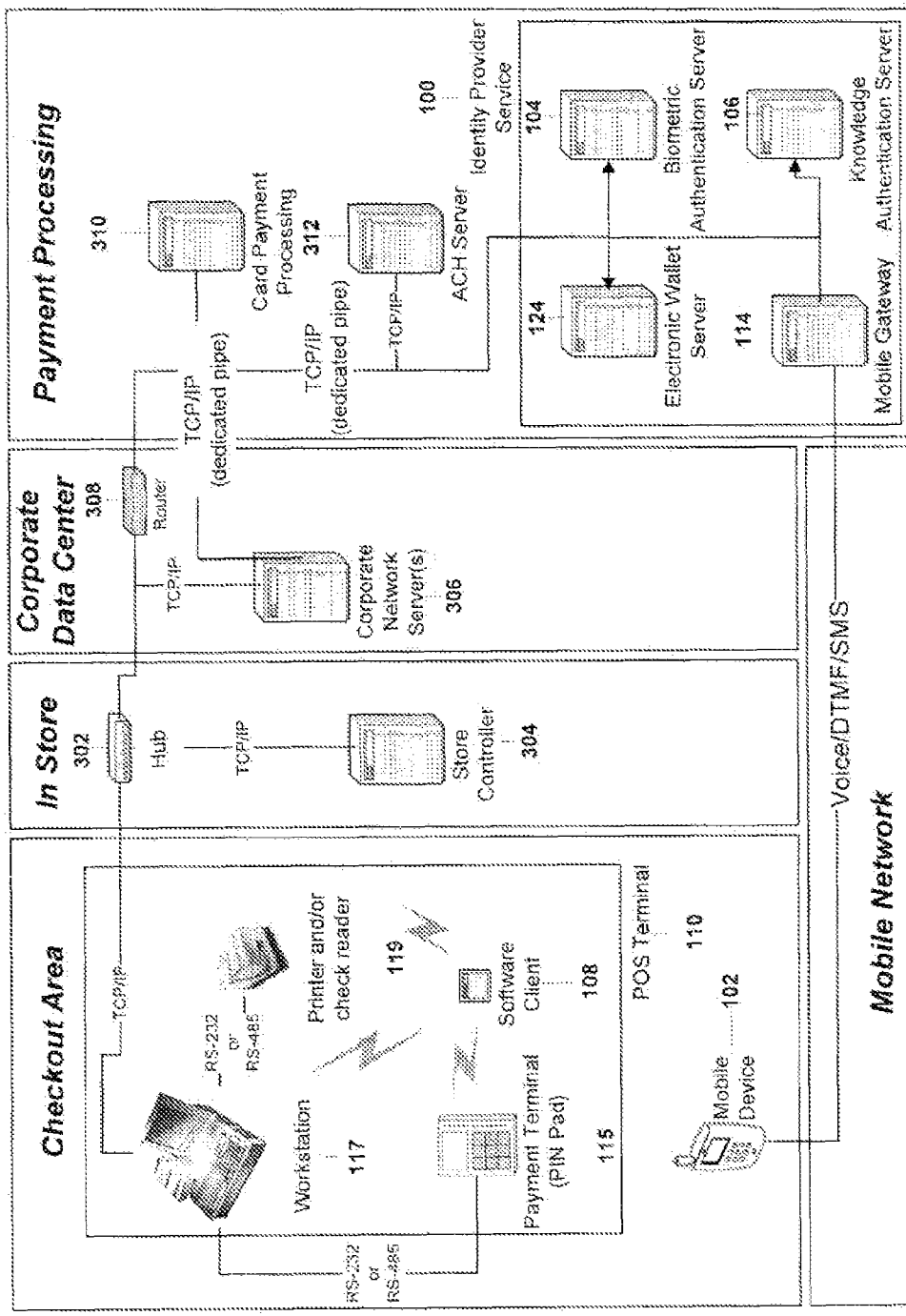
FIG. 3 depicts one embodiment of a merchant infrastructure architecture with which the identity provider service may interact with a merchant.

FIG. 3 depicts an embodiment of a merchant infrastructure architecture in which the present invention could be deployed. A merchant's checkout area can incorporate a POS terminal 110 including a workstation 117, such as an electronic cash register, coupled to a payment terminal 115 (e.g., a PIN pad). The workstation 117 can be further coupled to other peripheral devices such as a printer and/or check reader 119 that provide additional POS functionality. Typically, a software client 108 embedded within the POS terminal 110 gathers data during transactions, such as consumer passwords, authorization identifiers, phone numbers, product information, purchase amount, or the like, and communicates with the IPS 100 in order to transmit, request, and/or receive data. For example, the software client 108 can transmit an electronic wallet request when a consumer has selected the mobile payment option from the payment terminal 115. The software client 108 can reside within any of the aforementioned POS terminal 110 components or another merchant-specific component such as 304 or 306 (as further detailed below), as would be determined by the particular configuration and implementation. For example and without limitation, in one embodiment, the software client 108 may reside in the payment terminal 115 which serves as the component in the POS terminal 110 that initiates communication with the IPS 100. Alternatively, the software client 108 may reside in the store controller 304 or the corporate network server 306 that manages communication between the IPS 100 and the POS terminal 110. Those with ordinary skill in the art will recognize software client 108 may be divided into separate subcomponents and may reside in multiple portions of the aforementioned merchant components.

Any or all of the components of the POS terminal 110 (and the components of other POS terminals 110 if the merchant has multiple checkout areas, such as in a supermarket) can be further coupled through a hub 302 to the merchant's specific store controller 304 which can be linked, via the hub 302, to a corporate network server 306. The corporate network server 306 can be further coupled to a router 308 that can be further coupled to card payment processing services for card (i.e., credit or debit) transactions 310 or for Automated Clearing House ("ACH") checking transactions 312. The corporate network server 306 can also be further coupled to the IPS 100.

Those of ordinary skill in the art will recognize that the various communication channels and computer systems depicted in FIG. 1 and FIG. 3 can be implemented in a variety of known techniques and manners. For example and without limitation, rather than using dedicated TCP/IP connections between the corporate network server 306 and the IPS 100 and payment processors 310 and 312, Internet connections can be considered in alternative embodiments. Similarly, if the merchant's in-store computer network supports wireless networking technology, the POS terminal 110 can communicate with the store controller 304 wirelessly. As those of ordinary skill in the art will recognize, the communication among the merchant's POS terminal 110, the in-store controller 304, the merchant's corporate network server 306, and various payment processing servers 310 and 312 and the IPS 100 can be implemented through a variety of private or proprietary networked connections or through the Internet or other publicly accessible networks.

Those of ordinary skill in the art will also recognize that the control logic and data stored and used by the various computer systems as described above is merely illustrative and can be distributed throughout the various computer systems' logic controls and databases in alternative but functionally equivalent designs, including without limitation, the removal of certain systems and addition of other systems, without departing from the scope or spirit of the described embodiments. For example, although the provisioning module 120 and the transaction module 122 are typically described as independent components, they could be elements of one component or their functions can be handled by one component. In another example, a smaller merchant may not utilize a store controller 304 or have a corporate network server 306. Furthermore, various elements of the present invention's functionality could occur external to the IPS 100 and/or could be managed by a party other than the IPS 100 itself. For example, a merchant's store controller 304 and/or its corporate network server(s) 306 could handle functions previously described in relation to the IPS 100. Likewise, the mobile gateway 114, the biometric authentication server 104, the knowledge authentication server 106, and/or the electronic wallet server 124 could be hosted by one or more third parties external to the IPS 100.

As will be described below, the system of the present invention enables the functionality of a variety of mobile payment methodologies. The descriptions of FIGS. 4 through 8 are a sampling of such; however other embodiments could be possible as well.

Figure 4:
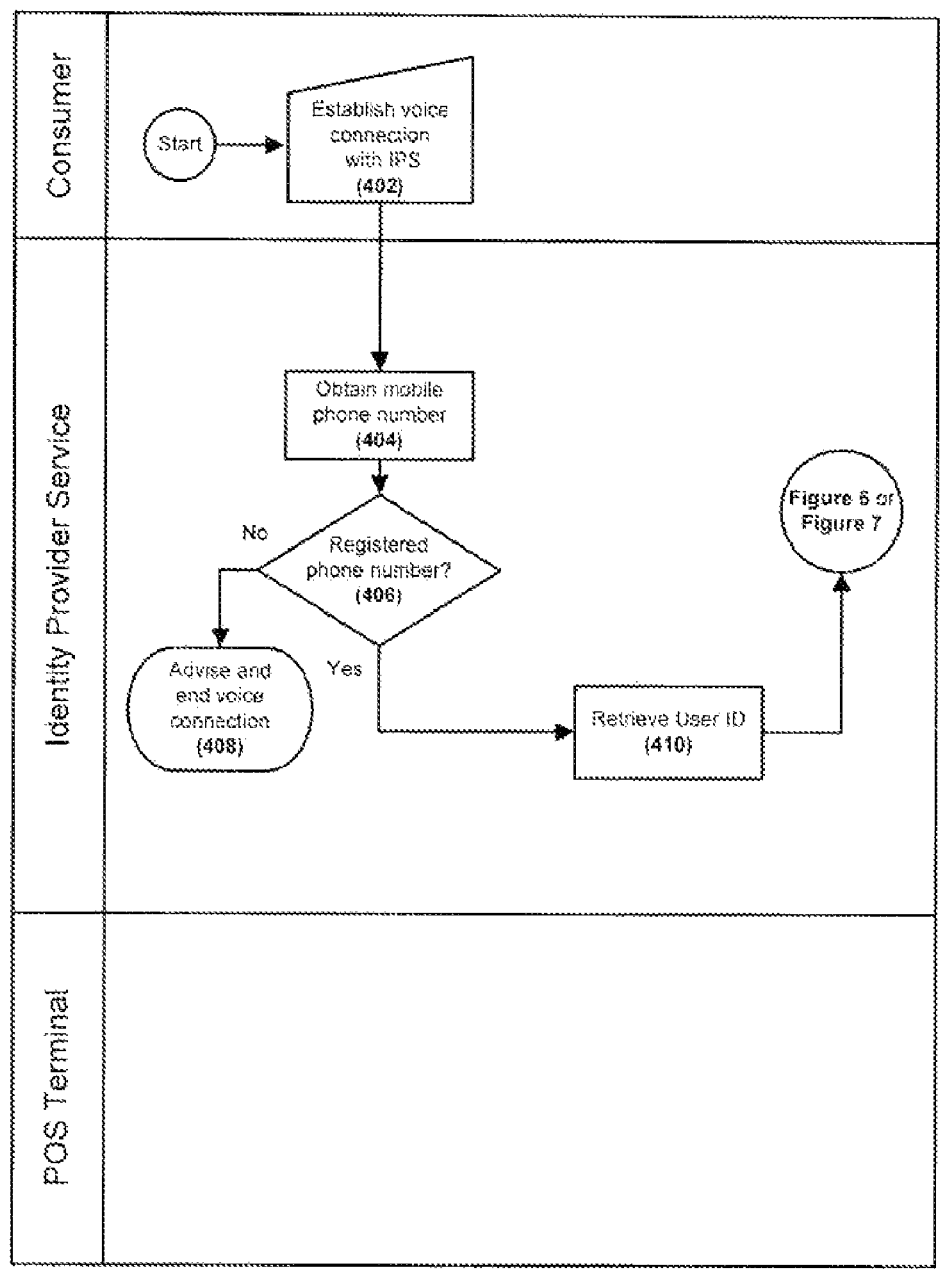
FIG. 4 depicts a flowchart of an embodiment of an initiation of a mobile payment process in which the consumer initiates a transaction via a mobile call to an identity provider service.

A mobile payment transaction can be initiated in a variety of methods, such as via a call or a text message to the IPS 100. FIG. 4 depicts a flowchart of one embodiment of an initiation of a mobile payment process in which the consumer initiates a transaction via a mobile call to the IPS 100. The consumer initiates an authorization request to the IPS 100 by calling the identity provider service number (step 402). The service number could be posted at the merchant location, such as near the POS terminal 110, could be stored on the consumer's mobile device 102 (e.g., in a mobile phone's phone book), and/or could simply be any easy to remember number (e.g. 1-800-CELL-PAY). The mobile gateway 114 receives the authorization request from the mobile device 102, obtains the mobile phone number contained therein, and forwards it to the transaction module 122 (step 404). The transaction module 122 compares the incoming mobile phone number with those stored in the mobile device database 126 to determine if the mobile device 102 is registered (step 406). If the mobile phone number is not registered, the transaction module 122 prompts the mobile gateway 114 to inform the consumer of this, such as via an automated message, and the call terminates (step 408).

If the mobile phone number is registered, the transaction module 122 retrieves the User ID associated with the mobile phone number stored in the mobile device database 126 (step 410). The process then continues as described in relation to either FIG. 6 or FIG. 7.

Figure 5:
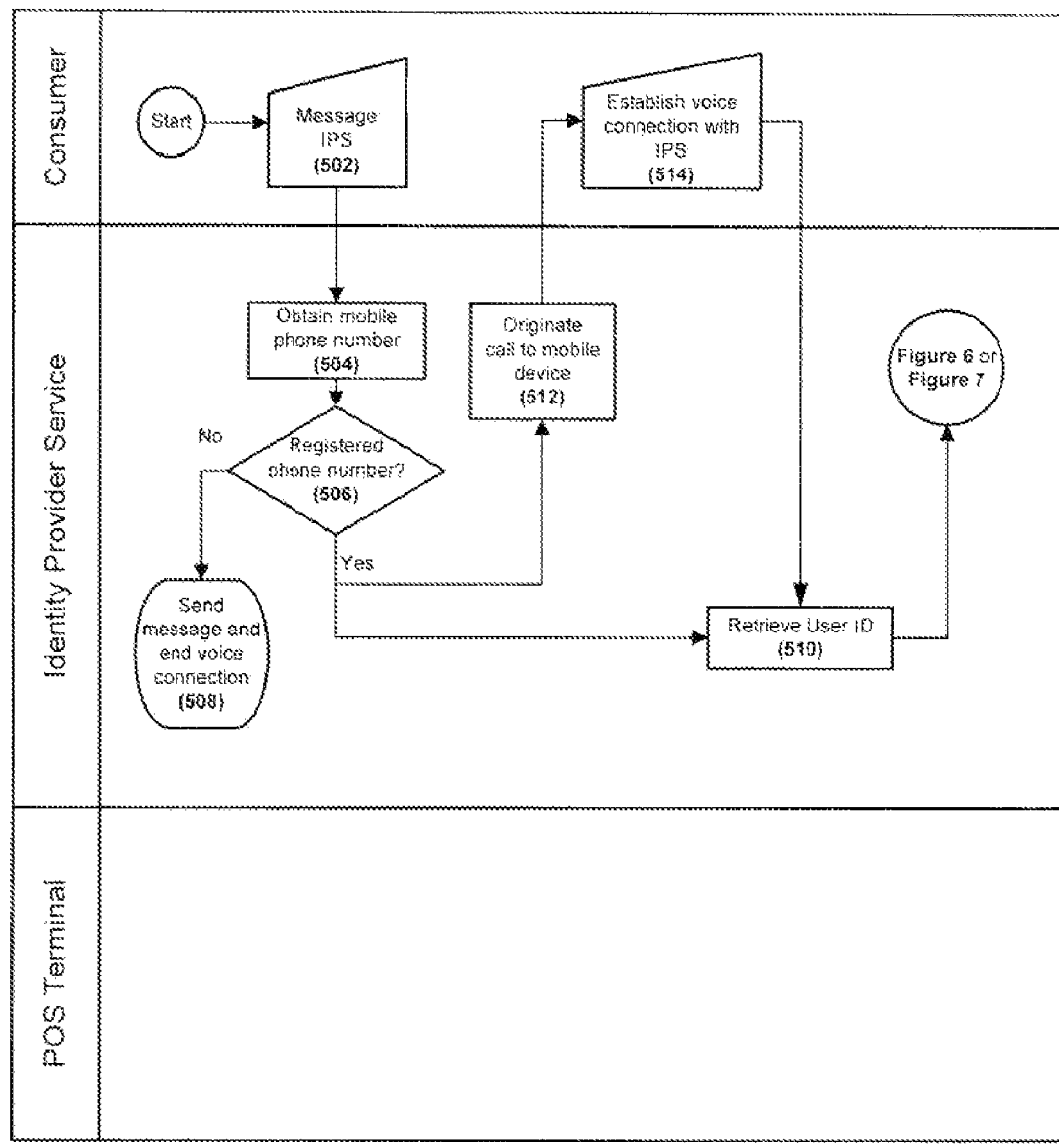
FIG. 5 depicts a flowchart of an embodiment of an initiation of a mobile payment process in which the consumer initiates a transaction via a text message to an identity provider service.

FIG. 5 depicts a flowchart of an initiation of a mobile payment process in which the consumer initiates a transaction via a text message rather than via a voice channel. The consumer initiates the transaction by transmitting a text message to the IPS 100 (step 502). The actual content of the message could vary per implementation of the system of the present invention. For example, the text message could include an instructional phrase, such as "PAY."

The mobile gateway 114 receives the text message from, the mobile device 102, obtains the mobile phone number of the messaging device, and forwards it to the transaction module 122 (step 504). The transaction module 122 compares the received mobile phone number with those stored in mobile device database 126 to determine if the mobile phone number is registered (step 506). If the phone number is not registered, the transaction module 122 prompts the mobile gateway 114 to transmit a text message to the mobile device 102 to inform the consumer and the call ends (step 508). Alternatively, the mobile gateway 114 could call the mobile device 102 and play a recorded message or a customer service representative could call and explain the situation.

If the phone number is registered within the mobile device database 126, the transaction module 122 retrieves the user ID associated with the mobile phone number (step 510). Additionally, the transaction module 122 prompts the mobile gateway 114 to originate a call to the mobile device 102 (step 512). When the consumer answers the call, a voice connection with the merchant gateway 114 is established (step 514), and the transaction process can be completed either as described in relation to FIG. 6 or FIG. 7.

In text message embodiments, the message sent to the IPS 100 could include additional data particular to the transaction to facilitate the process. For example, the consumer could include in the message a number associated with a particular account, such as "1" for his debit card, "2" for his credit card, or "3" for his checking account. Alternatively, the text message could include a phrase, such as "Visa" or "checking," to indicate the desired account. In another embodiment, the text message could indicate the amount of the transaction.

Figure 6:
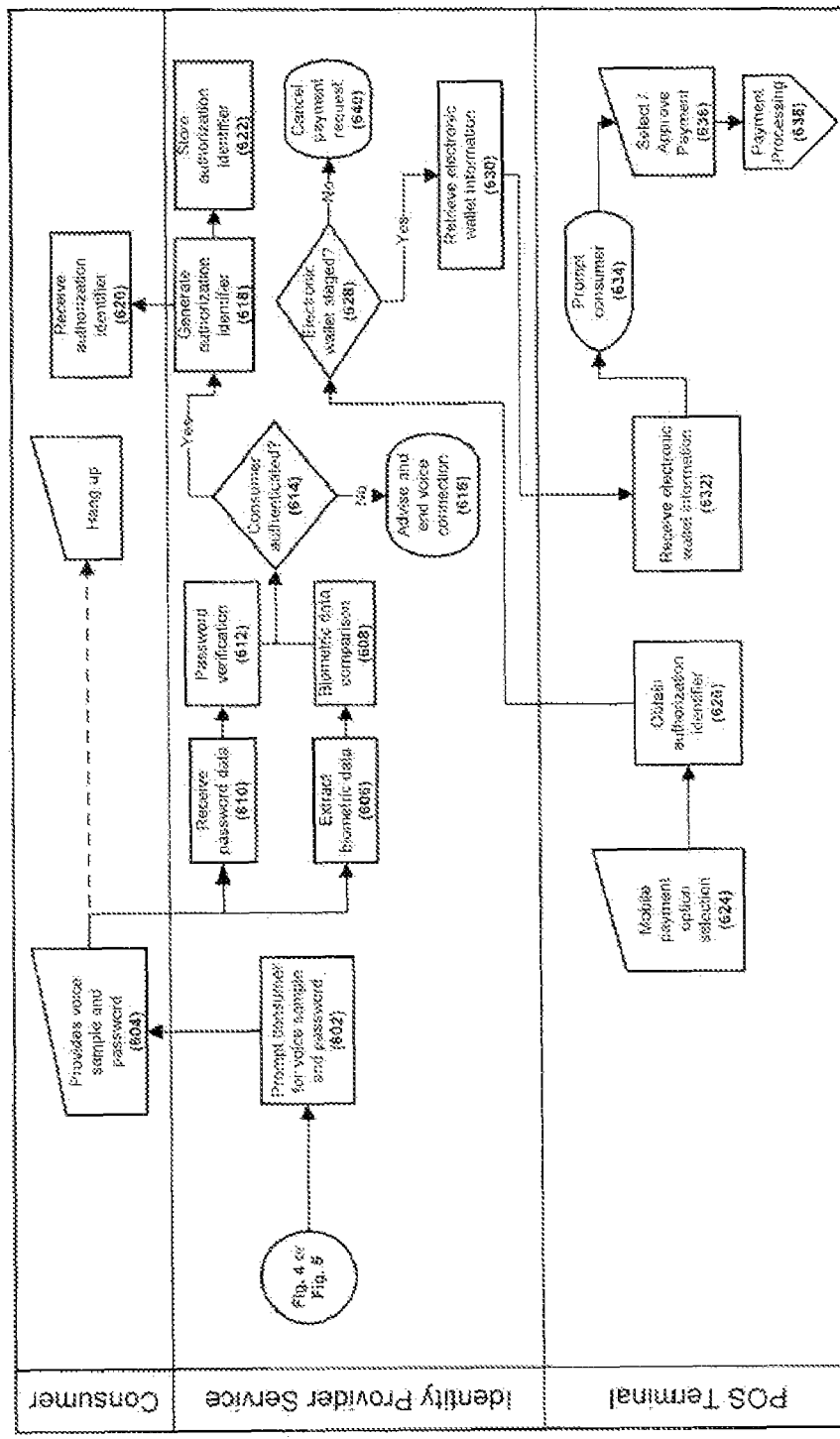
FIG. 6 depicts a flowchart of an embodiment of a completion of a mobile payment process wherein a consumer is authorized to conduct a transaction at any POS terminal.

FIG. 6 depicts a flowchart of an embodiment of a completion of a mobile payment process wherein a consumer is authorized to conduct a transaction at any POS terminal 110. As the consumer does not need to specify a particular POS terminal 110, the voice connection can be established virtually anywhere. For example, the consumer can establish a voice connection with the IPS 100 before leaving his house or while on his way to the merchant location.

Once a voice connection between the IPS 100 and consumer's mobile device 102 has been established (e.g., as depicted in FIG. 4 or 5), the transaction module 122 may prompt the consumer, typically via an automated message enabled by the mobile gateway 114, to provide a voice sample and password (step 602). In certain embodiments, the consumer may be requested to speak a password that he has previously registered (as described above). This enables the consumer to provide a biometric authentication sample and password in a single voice sample. For example, the mobile gateway 114 can utilize ASR technology to translate the voice sample into a text sequence containing the password information. In other embodiments, the biometric authentication sample and the password are obtained separately. For example, the consumer could be prompted to speak both a password for knowledge-based authentication and to repeat a particular word or phrase that is to be used as for biometric authentication. Likewise, the consumer could provide a password via DTMF, a text message, or another such function. In one embodiment, if the consumer initiates the transaction via a text message as depicted in FIG. 5, the password could have been included in that text message.

In enhanced embodiments, when the consumer establishes a voice connection with the IPS 100, he could also indicate which financial account he wishes to employ for the transaction (if he has not already done so, for example, as described during the initiation steps of FIG. 5). He could do so via a variety of means such as IVR, DTMF, or the like. For example, the consumer could say the name of the account, such as "Citibank Visa" or "checking," or could use the keypad of his mobile device 102 to select the account, such as "1" for Visa, "2" for MasterCard," or "3" for checking.

Once the consumer provides the voice sample (step 604), the transaction module 122 sends it and the User ID to the authentication services gateway 116 which in turn transmits them (or it, as the case may be) to the biometric authentication server 104 and the knowledge authentication server 106. The biometric authentication server 104 extracts the biometric data contained within the voice sample (step 606). The biometric authentication server 104 also retrieves biometric data associated with the User ID from the biometric database 136 and compares it with the biometric data extracted from the voice sample (step 608). Likewise, the knowledge authentication server 106 receives the obtained password data, such as a text sequence from the transaction module 122 (step 610). The knowledge authentication server 106 retrieves registered verification information associated with the User ID from the knowledge database and compares it with the received password data (step 612).

Once the authentication servers 104, 106 have performed the aforementioned comparisons, they return the results to the authentication services gateway 116, which in turn sends the results to the transaction module 122. The transaction module 122 determines if the results of the comparisons authenticate the consumer (step 614). In general, received biometric data is considered to match registered biometric data if the data sets are sufficiently similar (i.e., they need not be identical). For example, once the biometric authentication server 104 compares the received biometric data with stored biometric data, it can generate a result score indicative of the similarity of the data sets. If the result score meets the required matching threshold, the comparison can be considered successful. If either the biometric or knowledge-based comparison provides a negative result, the consumer is advised of this situation by the transaction module 122 via the mobile gateway 114 and the call is ended (step 616). Alternatively, the consumer could be allowed another authentication attempt before the call is terminated if the biometric comparison yields a positive result, but the password comparison failed. A successful biometric comparison coupled with a failed password evaluation could indicate a consumer error (e.g., the consumer could have mistakenly provided the wrong password).

Once the consumer has been authenticated, the transaction module 122 generates an authorization identifier (step 618). The authorization identifier can be any alphanumeric data, such as a number or code, that can be transmitted to the mobile device 102. In one embodiment, an authorization identifier can include a combination of the consumer's mobile phone number and other alphanumeric data. Although an authorization identifier could be unique, it need not be if it is associated with other information, such as a POS identifier, User ID, or the like, as described below. Once the authorization identifier has been generated, the transaction module 122 transmits it to the mobile gateway 114, and it in turn is received by the mobile device 120 (step 620). In an alternate embodiment, rather than generating an authorization identifier, the transaction module 122 could retrieve a security code previously registered by the consumer and utilize it as the authorization identifier. A consumer could register a security code for use at any merchant participating with the IPS 100 or could register one or more security codes for particular merchants. For example, a consumer could be a frequent shopper at a particular grocery store or at a certain restaurant and rather than receive a new authorization identifier for each transaction at this merchant, the consumer could use the registered security code. As the security code is already known to the consumer, it need not be transmitted to the mobile device 120. Rather, the transaction module 122 could transmit an indication of successful authorization to notify the consumer that he may now use his security code. In one embodiment, the authorization identifier is alphanumeric data transmitted as a text message. In another embodiment, the authorization identifier is transmitted to the mobile device as barcode image that can be viewed via the display of the mobile device 102. In yet another scenario, the authorization identifier is communicated to the consumer via an audio message.

Additionally, the transaction module 122 associates the authorization identifier with the consumer's User ID and stores this association in the staging database 128, thereby "staging" the consumer's electronic wallet for an upcoming payment transaction (step 622). This staging process provides the transaction module 122 with an indication that the consumer has been authenticated and wishes to conduct a mobile payment transaction. In alternate embodiments, additional information could also be stored in the staging database 128 in association with the User ID. As aforementioned, during mobile payment initiation, a consumer could indicate to the transaction module 122 a registered financial account to be used for the transaction. Registered financial account information, such as the account number or an identifier indicative of the account, could be associated with the User ID and/or authorization identifier in the staging database 128.

In one embodiment, a voice connection between the consumer's mobile device 102 and mobile gateway 114 is maintained throughout the aforementioned authentication and the consumer is informed whether he can proceed with the transaction at the end of the call. In an alternative embodiment, the call could end after the consumer has provided his voice sample and the password. The mobile gateway 114 could transmit a message to the mobile device 102, such as a text message or an automated voice message, to notify him of the success or failure of the authentication. In yet another embodiment, the consumer is only notified if the authentication has failed.

When the consumer is ready to make his purchase (i.e., has arrived at the merchant location and obtained the desired goods), he approaches a POS terminal 110 and initiates the transaction in the typical fashion. When prompted for payment, the consumer, or alternatively the clerk operating the POS terminal 110, may select a mobile payment option available at the payment terminal 115 (step 624). The consumer is then prompted to provide the authorization identifier. If the authorization identifier is alphanumeric data, the consumer can enter it via the keypad of the payment terminal 115 or provide it verbally to the clerk (who in turn enters into the POS terminal 110). If the authorization identifier is barcode data, the consumer can present it on the display of the mobile device 102 and it can be obtained via a barcode reader included with the POS terminal 110. Alternative embodiments and merchant environments may enable a mobile device 102 equipped with RFID or NEC technology to utilize such technologies to transfer the authentication identifier to the POS terminal 110. Once the authorization identifier is received at the POS terminal 110 (step 626), it is transmitted to the IPS 100 and received by the merchant gateway 118. The merchant gateway 118 forwards the authorization identifier to the transaction module 122, which then queries the staging database 128 to determine if there is an electronic wallet staged in association with the authorization identifier (step 628). If no electronic wallet is staged, the transaction module 122 cancels the payment request (step 640) and notifies the POS terminal 110.

In certain embodiments, a "staged electronic wallet" may have an expiration time, such that if the consumer does not conduct a transaction within an expected time frame, the staged information is automatically removed from the staging database 128. For example and without limitation, during the call session, or if applicable, during the text message sent to initiate the voice connection, the consumer could supply the predicted time of his purchase, such as via IVR or DTMF inputs. Alternatively, a standard time frame may be set by the IPS 100 itself (which may be modified by the consumer) and reminders may be sent to the consumer (e.g., via text messages or phone calls, etc.) to extend the time frame for a staged transaction when its expiration draws near. Other alternative embodiments may implement a capability to configure "recurring" staged transactions for specified days and times for consumers who may have a regular schedule of shopping (e.g., grocery shopping every morning between 8 AM and 10 AM on Saturdays, etc.). Additionally, a consumer could contact the IPS 100 to deactivate an authorization identifier before it has been used or expired (e.g., the consumer decided not to proceed with the staged transaction). In other alternate embodiments, a staged transaction could have a dollar limit. The dollar limit could be determined by the consumer (e.g., by registered preferences or per each transaction), by a merchant (e.g., a merchant could limit mobile payment transactions to those $50.00 or under), or by the IPS 100. The dollar limit could vary by transaction. For example, a merchant could have a universal limit or the limit could fluctuate as determined by the items purchased. Furthermore, merchant and/or IPS 100 limits could override a consumer's desired dollar limit.

Furthermore, an authorization identifier could be valid for a single use or for multiple uses. For example, if an authorization identifier is valid for only one use, the staged electronic wallet could be purged after a transaction. If an authorization identifier is valid for multiple uses, it could remain valid for use at one or more locations within the allowed time frame. Likewise, an authorization identifier could be valid only for transactions meeting certain criteria (under a certain price, not valid for age-restricted products, etc.) or could become invalid after a dollar limit is reached.

If the transaction module 122 determines that there is an electronic wallet associated with the received authorization identifier in the staging database 128, it retrieves the requested information, typically financial account and loyalty account information, from the electronic wallet associated with the User ID in the electronic wallet database 130 (via the electronic wallet server 124) (step 630). The transaction module 122 sends this information to the merchant gateway 118, which transmits it to the POS terminal 110. The POS terminal 110 receives the electronic wallet information (step 632). The consumer is then prompted at the POS terminal 110 to approve the transaction (step 634). Furthermore, if an electronic wallet contains multiple financial accounts (e.g., checking account, credit card, debit card, etc.), the POS terminal 110 may display them to the consumer, such as via the payment terminal 115, prompting the consumer to select an account to utilize. Upon approval of the transaction, and possibly selection of the desired account (step 636), the POS terminal 110 may transmit the chosen account details and purchase transaction details to a payment processor such as card payment processing 310 or an ACH server 312, as is typical in standard merchant payment transactions (step 638).

Unlike FIG. 6, other embodiments may not employ an authorization identifier for the consumer to present at the POS terminal 110. For example, some embodiments may require that the consumer provide the IPS 100 with an indication of the particular POS terminal 110 to be used for the transaction. Merchants register their POS terminal(s) 110 with the IPS 100 via "POS identifiers," which are stored in the merchant POS database 134. Each individual POS terminal 110 can be associated with an identifier by the IPS 100 or the merchant. The POS identifier could be any form of alphanumerical data, such as a number, a phrase of words, or the like, and can be located anywhere near the POS terminal 110, as long as it is visible to consumers. For example, the POS identifier could be posted on a sign by the POS terminal 110, on a sticker affixed to the POS terminal 110, or the like. As will be described below, the POS identifier could be, but need not be, unique to a particular POS terminal 110, depending upon the implementation of the system of the present invention.

Figure 7:
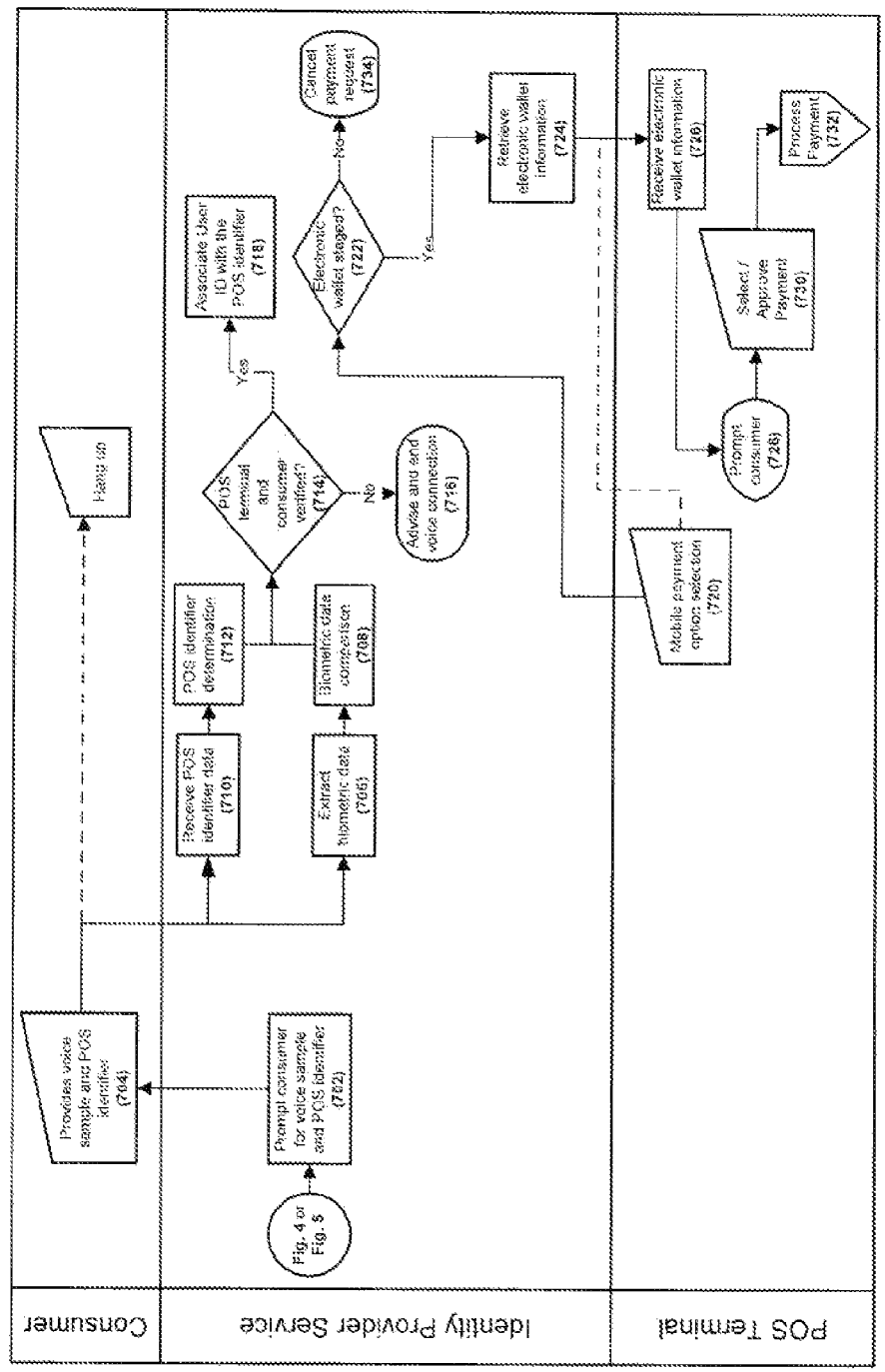
FIG. 7 depicts a flowchart of an embodiment of a completion of a mobile payment process wherein a consumer is authorized to conduct a transaction at a particular POS terminal.

FIG. 7 depicts a flowchart of an embodiment of a completion of a mobile payment process wherein the mobile transaction is implemented through the use of such a POS identifier. The consumer initiates the transaction either as depicted in FIG. 4 or FIG. 5 and ascertains the POS identifier. Once a voice connection between the IPS 100 and consumer's mobile device 102 has been established, the transaction module 122, via the mobile gateway 114, prompts the consumer to provide the POS identifier and his voice sample (step 702). In one embodiment, the consumer speaks the POS identifier and the spoken POS identifier can serve as both the voice sample and the POS identifier. The POS identifier could be specifically designed to include phrases that when spoken are sufficient for biometric authentication. For example, the mobile gateway 114 can utilize ASK technology to translate the voice sample into a text sequence containing the POS identifier. In other embodiments, the voice sample and the POS identifier are obtained separately. For example, the consumer could be prompted to speak both the POS identifier and a particular phrase that is to be used as a voice sample. Likewise, the consumer could be prompted to supply the POS identifier via DTMF, a text message, or another such function. In one embodiment, if the consumer initiates the transaction via a text message as depicted in FIG. 5, the POS identifier could have been included in that text message. In yet another embodiment, in addition to a voice sample and a POS identifier, the consumer could be prompted to provide a password, which could be utilized to provide further authentication (such as described in respect to FIG. 6).

Once the consumer supplies the requested POS identifier and voice sample, the transaction module 122 sends the voice sample and the User ID (associated with the mobile phone number) to the authentication services gateway 116, to authenticate the consumer biometrically (step 706 and step 708), similar to the biometric process described in relation to FIG. 6. Furthermore, the transaction module receives POS identifier data, such as a text sequence, from the mobile gateway 114 so that it can query the merchant POS database 134 (step 710). The transaction module 122 then determines if the received POS identifier data indicates a registered POS terminal 110 (step 712). Typically, the transaction module 122 can query the merchant POS database 134 for a corresponding POS identifier. In an alternate embodiment, the POS identifier associated with a POS terminal 110 serves as an indicator of the actual POS identification information stored in the merchant POS database 134. For example, the POS identifier could be a simple phrase that the transaction module 122 can use to locate more complex identification information, such as the serial number of the POS terminal 110.

Once the aforementioned evaluations have been performed, the IPS 100 determines if the results verify both the consumer and the POS terminal 110 (step 714). If either evaluation fails to provide a positive result, the consumer is advised of this situation and the call is ended (step 716). In one scenario, the consumer is allowed to reattempt to verify the POS terminal 110 and/or his identity before the call is terminated.

If both of the comparisons result in positive outcomes, the transaction module 122 associates the POS identifier with the consumer's User ID and stores this in the staging database 128 (step 718), thereby staging the consumer's electronic wallet for the upcoming transaction.

The voice connection between the consumer's mobile device 102 and mobile gateway 114 can be maintained throughout the aforementioned authentication, with the consumer being informed whether he can proceed at the end of the call. Alternatively, the call could end after the consumer has provided his voice sample and the POS identifier, and the merchant gateway 114 could transmit an indication of success or failure to the mobile device 102 (e.g., a text message or an automated voice message). In yet another embodiment, the consumer is only notified if the authentication has failed.

Once the consumer has completed his call to the IPS 100 and arrives at the POS terminal 110 upon completion of his shopping, the consumer, or alternatively the clerk operating the POS terminal 110 selects the mobile payment option from the payment terminal 115 (step 720). The POS terminal 110 transmits its associated POS identifier and a request for the consumer's electronic wallet information to the merchant gateway 118. The transaction module 122 then determines if there is a corresponding POS identifier in the staging database 128 (step 722). If there is none (e.g., a transaction was not staged or the staged information has been purged), the transaction module 122 cancels the payment request (step 734) and notifies the POS terminal 110.

If the transaction module 122 locates a corresponding POS identifier, the transaction module 122 retrieves the requested information from the electronic wallet that is associated with the User ID from the electronic wallet database 130 (step 724) and transmits it the POS terminal 110. The POS identifier could be associated with a particular merchant or merchant chain and could indicate to the transaction module 122 the appropriate loyalty account to retrieve. The POS terminal 110 receives the electronic wallet information (step 726) and the consumer is prompted to approve the transaction and, if multiple payment options are available, select a financial account (step 728). Once the consumer has approved the transaction and, if need be, selected the desired account (step 730), the payment transaction proceeds as is typical for the selected financial account (step 732).

In an alternate embodiment, once the consumer and the POS terminal 110 have been authenticated, the transaction module 122 could transmit electronic wallet information to the POS terminal 110 immediately rather than staging the transaction at the IPS 100. In such an embodiment, the merchant location or corporate data center may have its own staging functionality in order to store a queue of staged electronic wallets (e.g., at the POS terminal 110, the store controller 304, the corporate network server 306, etc.). Such wallet information may only be accessed when the consumer additionally enters verification in formation at the payment terminal 115 in order to distinguish himself from other consumers that may also have staged their electronic wallets with the same POS identifier.

Although typically a POS identifier is unique, in other embodiments of the present invention, a POS identifier need not be. A POS identifier might not be globally unique, but only unique within a particular merchant location or chain. For example, each individual Target store may use the same set of POS identifiers or Target and Wal-Mart could have overlapping POS identifiers. Therefore, in addition to a POS identifier associated with a particular POS terminal 110, the transaction module 122 could receive merchant location or chain information, allowing it to limit its search to POS identifiers associated with POS terminals 110 registered for a specific merchant or merchant chain. For example, the transaction module 122 could only compare the received POS identifier with those associated with Target store #12345 or only those associated with the Target merchant chain. Furthermore, a POS identifier could be unique only for a particular region, such as a shopping mall or geographic area (e.g., merchants within a particular ZIP Code, state, etc.). The POS terminal 110 could transmit its region information with its POS identifier to the transaction module 122, which could then compare the POS identifier against those associated with the region. For example, the transaction module 122 could only compare the received POS identifier with those associated with POS terminals 110 located within a particular ZIP Code.

Alternatively, additional information received from the POS terminal 110, such as the consumer's mobile phone number, or the like, could allow the present invention to utilize non-unique POS identifiers. The transaction module 122 could associate the consumer's mobile phone number with the staged electronic wallet. The consumer could provide this number at the POS terminal 110, which in turn transmits it to the merchant gateway 118 in conjunction with the POS identifier. The transaction module 122 could then search for a staged electronic wallet associated with both the POS identifier and the mobile phone number.

Although the processes depicted in regard to FIGS. 6 and 7 have been discussed independently, they could also function in concert. A consumer could provide a POS identifier to the transaction module 122 when initiating a transaction, could receive an authorization identifier after having been authenticated, and could then provide this authorization identifier when completing his transaction at the appropriate POS terminal 110. In addition to providing further security, such a combined process could enable other embodiments. For example, a unique POS identifier could be assigned to an entire locality or merchant chain (as opposed to a particular POS terminal 110), thereby allowing the consumer to initiate a transaction at any corresponding merchant by providing an authorization identifier. That is, after being authenticated, a consumer could present the authorization identifier at the PUS terminal 110 of any merchant associated with that POS identifier to authorize payment. For example, the entire Target merchant chain could have a single POS identifier. A consumer could stage a transaction for Target and receive an authorization identifier valid at any Target store. In another scenario, a POS identifier could be assigned to a region, such as a city's merchant district or a shopping mall. The consumer could stage a transaction for the region via its POS identifier and receive an authorization identifier valid at for any merchant within the region. Additionally, a POS identifier could be for a merchant type. For example, a consumer planning a road trip could utilize a gas station POS identifier to stage transactions and receive an authorization identifier valid at any participating gas stations. Furthermore, a POS identifier could combine one or more of the aforementioned elements. For example, a consumer could stage mobile transactions with a POS identifier for a merchant type (e.g., gas stations) within a particular region (e.g., the route of a road trip) and receive an appropriate authorization identifier. Likewise, a consumer could stage mobile transactions with a POS identifier of a merchant chain (e.g., Shell gas stations) within a particular region.

As aforementioned, an authorization identifier could be for one-time use or for multiple uses. If the consumer stages a transaction with a POS identifier for a merchant chain or a region, the consumer could use the authorization identifier to conduct a transaction multiple times, and with multiple merchants, within that chain or region. For example, a consumer could stage a transaction for a particular shopping mall and could use the authorization identifier to conduct mobile payments at any merchant within the mall.

Figure 8:
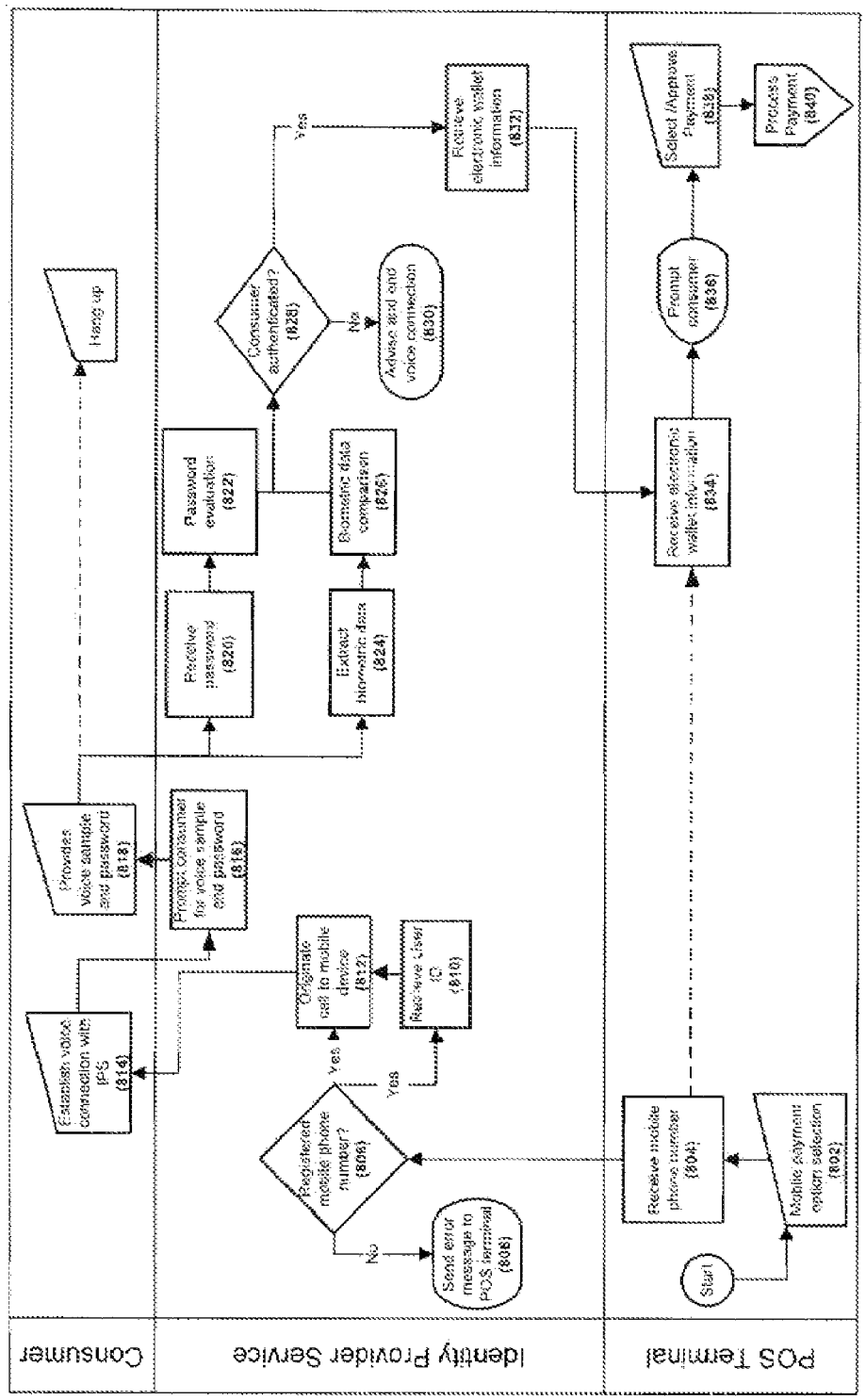
FIG. 8 depicts a flowchart of an embodiment of a mobile payment process wherein the transaction is initiated via the POS terminal.

Other embodiments may differ from those of FIGS. 4 through 7 by eliminating the staging process and initiating a mobile payment transaction directly from the PUS terminal 110. For example, as depicted in FIG. 8, the consumer selects the mobile payment option from the POS terminal 110, such as by pressing a button on the payment terminal 115 (step 802). The consumer then, typically via a keypad on the payment terminal 115, enters the mobile phone number he registered with the IPS 100 during enrollment (step 804). The consumer could be prompted to provide registered verification information (e.g., a password) in addition to the mobile phone number. The PUS terminal 110 transmits the mobile phone number to the merchant gateway 118. In one scenario, the consumer could also indicate at the POS terminal 110 the financial account he wishes to employ for the transaction, such as by entering a number or phrase associated with the registered account via the payment terminal 115.

The transaction module 122 receives the mobile phone number and queries the mobile device database 126 to determine if a corresponding number is registered with the IPS 100 (step 806). If the mobile phone number is not registered, an error message is transmitted to the POS terminal 110 (step 808). The consumer can then make another attempt, select a different payment method, or cancel the transaction. If the mobile phone number is registered, the transaction module 122 retrieves the User ID associated with the mobile phone number (step 810). The transaction module 122 then prompts the mobile gateway 114 to originate a call to the mobile device 102 (step 812).

When the consumer establishes a voice connection with the IPS 100 by answering the call (step 814), the mobile gateway 114 prompts him to provide a voice sample and/or a password (step 816). As mentioned in the previously discussed processes, in one embodiment the consumer could provide the voice sample and the password simultaneously by speaking the password. Alternatively, the voice sample and the password could be provided separately. If the consumer has previously provided verification information at the POX terminal 110, this could be utilized or the consumer could be requested to provide an additional password for further security. Once the consumer provides the voice sample and password (step 818), the mobile gateway 114 forwards this information to the transaction module 122, which conveys it onto the authentication services gateway 116 for further parsing and distribution. The biometric authentication server 104 extracts the biometric data from the voice sample (step 824) and compares it with registered biometric data associated with the User ID (step 826). Likewise, the mobile gateway 114 converts the password into a text sequence, which is sent to the transaction module 122, onto the authentication services gateway 116, and to the knowledge authentication server 106 (step 820). The knowledge authentication server 106 compares the password data with verification information associated with the User ID (step 822). The authentication services gateway 116 receives the results of these comparisons and forwards the results to the transaction module 122, which determines if the results of the comparisons authenticate the consumer's identity (step 828). If either comparison fails to provide a positive result, the transaction module 122 prompts the mobile gateway 113 to advise the consumer of this situation and the call is ended (step 830). In one scenario, the consumer is allowed to reattempt to authenticate his identity before the call is terminated.

If both of the comparisons result in positive outcomes, the transaction module 122 accesses the electronic wallet server 124 to retrieve the requested information contained within the electronic wallet associated with the User ID (step 832) and transmits this data to the POS terminal 110. The POS terminal 110 receives the electronic wallet information (step 834) and the consumer is prompted to approve the transaction (step 836). If the POS terminal 110 previously sent an indication of the desired financial account to the transaction module 122, the account selection could occur automatically. If the multiple payment options are transmitted from the electronic wallet, the consumer will be requested to select the financial account he wishes to employ. Once the consumer has approved the transaction and, if need be, selected the desired account (step 838), the payment transaction proceeds as is typical for the selected financial account (step 840).

Although the present invention has been described with reference to the foregoing embodiments, those of ordinary skill in the art will recognize that changes can be made in form and detail without departing from the spirit and scope of this disclosure. For example and without limitation, while the present invention has been described with reference to a "bricks and mortar" merchant infrastructure, those with ordinary skill in the art will recognize that other environment, such as an ATM or vending machine, may also benefit from the present disclosures. Additionally, those with ordinary skill in the art will recognize that other merchant channels such as, but not limited to, an online or e-commerce transaction architecture could also make use of the claimed invention. For example, the present invention could provide a convenient means for a consumer to verify his identity to approve an online stock trade or to verify his age to access and/or purchase age-restricted material available via the Internet.

Furthermore, although the present invention has been described typically in terms of a financial transaction, this is not to be construed as limiting. The processes herein described could be used for identification, for age verification, loyalty or reward program processing, or for any other functionality enabled by content of an electronic wallet. The methods and system of the present invention could be implemented apart from or in supplement to financial transactions. For example, the present invention could be used to determine if a consumer is authorized to use a credit card presented for payment or if he is old enough to access an age-restricted venue. A consumer could indicate his desired service via a text message and/or during a call session, such as by messaging or speaking a particular word or phrase. For example, "ENROLL" could signify the consumer wishes to activate his electronic wallet, "STOP" could indicate the consumer wishes to suspend mobile payment services, "CANCEL" could indicate the consumer wishes to cancel a staged transaction, "PAY" could signify that the consumer wishes to lake a POS payment, "BILL" could signify the consumer wishes to authenticate a bill payment, "ID" could signify that the consumer wishes to validate his identity, and "AGE" could signify the consumer wishes to authenticate his age.

Furthermore although the processes described above have suggested using a consumer's mobile phone number as a means to identify the mobile device 102, other device identifiers could be used instead of, or in addition to, the mobile phone number. For example, during enrollment, the provisioning module 120 could obtain the electronic serial number ("ESN") and/or the mobile identification number ("MIN") of the consumer's mobile device 102, and store them in association with a User ID in the mobile device database 126. During subsequent transactions, the transaction module 120 could obtain the ESN and/or MIN from the mobile device 102 and employ them to retrieve the appropriate user ID from the mobile device database 126. Similarly, the foregoing processes have described the generation and use of an internal User ID to track a consumers transaction through the various components and databases of the IPS 100. Those with ordinary skill in the art will recognize that alternative embodiments in keeping with the spirit of the invention may, for example and without limitation, use pre-existing identifiers, such as the mobile device number itself rather than generate a new User ID. Alternatively, in one embodiment, a registered consumer could use a mobile device 102 that is not associated with him in the mobile device database 126. For example, a consumer could desire to conduct a mobile payment transaction, but may not have access to his registered mobile device 102 (e.g., he forgot his mobile phone and is borrowing one). During such a transaction, since the mobile device 102 utilized is not associated with the consumer, the transaction module 122 need not determine if it is registered and the consumer's User ID, and therefore electronic wallet, could be located via biometric and/knowledge-based authentication (such as via the processes previously described).

Additionally, the use of voice biometrics in the foregoing description is not to be construed as limiting, as the processes described herein could be implemented with any biometric data, such as fingerprints, iris scans, or the like. For example, although at the time of this disclosure a typical consumer does not own a mobile phone equipped with a fingerprint scanner, such mobile devices could become more common. Therefore, the present invention could biometrically authenticate a consumer from data acquired from his fingerprints instead of, or in addition to, his voice. As described in the foregoing, the consumer may be prompted to provide the registered verification information, such as a password, during each mobile payment transaction. In enhanced embodiments, more than one password may be obtained during enrollment and stored in the knowledge database 138, which would enable the IPS 100 to request the consumer to provide one or more of a variety of registered passwords during different mobile payment transactions. For example and without limitation, when the consumer establishes a call with the IPS 100, the transaction module 120, via the mobile gateway 114, could initiate a challenge and response session during which the consumer provides one or more passwords as prompted. This can allow the IPS 100 to randomize the password requested, thereby increasing the security of the system. Those skilled in the art will also recognize that other verification information, such as but not limited to an account number or any other information related to the consumer, can substitute for a password in other embodiments. Alternatively, a consumer could be authenticated solely via biometric comparison. For example, during authentication, the consumer could speak one or more predetermined words or phrases or could be prompted to repeat one or more words or phrases provided during a challenge and response session. The consumer could then be authenticated biometrically without the use of knowledge-based information.

Terminology used in the foregoing description is for the purpose of describing the particular versions or embodiments only, and is not intended to limit the scope of the present invention that will be limited only by the appended claims. As used herein and in the appended claims, the singular forms "a," "an," and "the" include plural references unless the context clearly dictates otherwise. Similarly, the words "include," "includes" and "including" when used herein shall be deemed in each case to be followed by the words "without limitation." Unless defined otherwise herein, all technical and scientific terms used herein have the same meanings as commonly understood by one of ordinary skill in the art. All publications mentioned herein are incorporated by reference. Nothing herein is to he construed as an admission that the embodiments disclosed herein are not entitled to antedate such disclosure by virtue of prior invention. Thus, various modifications, additions and substitutions and the like can be made without departing from the spirit of the invention and these are therefore considered to be within the scope of the invention as defined in the following claims.

What is claimed is:

1. A method for providing multi-factor authentication for payment transactions using a mobile device, the method comprising:

receiving, from the mobile device, a text message for establishing a voice connection receiving a device identifier associated with the mobile device;

determining if the device identifier corresponds to a registered device identifier; establishing the voice connection with the mobile device;

receiving through the voice connection a voice sample of a consumer associated with the mobile device;

comparing the voice sample with a registered voice sample associated with the mobile device;

converting the voice sample into a text sequence;

comparing at least a portion of the text sequence with a registered text sequence associated with the mobile device;

generating an authorization identifier in response to comparing the at least a portion of the text sequence, to be presented by the consumer at a point of transaction; and transmitting the authorization identifier to the mobile device.

2. The method of claim 1, further comprising initiating the voice connection with the mobile device upon determining that the device identifier corresponds to the registered device identifier.

3. The method of claim 1, wherein the text message includes a point-of-sale identifier.

4. The method of claim 1, wherein the text message includes verification information relating to the consumer.

5. The method of claim 4, further comprising comparing the verification information to registered verification information associated with the mobile device.

6. The method of claim 1, wherein the authorization identifier comprises one or more of alphanumeric data and barcode data.

7. The method of claim 1, wherein the authorization identifier is valid for multiple payment transactions.

8. The method of claim 1, wherein at least a portion of the voice sample comprises a point-of-sale identifier.

9. The method of claim 8, further comprising associating the authorization identifier with a point-of-sale terminal associated with the point-of-sale identifier.

10. The method of claim 1, further comprising requesting additional voice samples from the consumer through the voice connection in order to obtain additional verification information from the consumer.

11. A method for providing multi-factor authentication for payment transactions using a mobile device, the method comprising:

receiving, from the mobile device, a text message for establishing a voice connection receiving a device identifier associated with mobile device;

determining if the device identifier corresponds to a registered device identifier;

establishing the voice connection with the mobile device;

receiving through the voice connection a voice sample of a consumer associated with the mobile device;

comparing the voice sample with a registered voice sample associated with the mobile device;

generating an authorization identifier in response to comparing the voice sample, to be presented by the consumer at a point of transaction; and transmitting the authorization identifier to the mobile device.

* * * * *